UNITED STATES PATENT OFFICE.

EDWARD F. KELLEY, OF BRIDGEPORT, CONNECTICUT, ASSIGNOR TO THE ROYAL EQUIPMENT COMPANY, OF BRIDGEPORT, CONNECTICUT, A CORPORATION OF CONNECTICUT.

FRICTION-LINING.

1,151,690.      Specification of Letters Patent.      Patented Aug. 31, 1915.

No Drawing.      Application filed March 9, 1911. Serial No. 613,469.

*To all whom it may concern:*

Be it known that I, EDWARD F. KELLEY, a citizen of the United States, residing at Bridgeport, county of Fairfield, State of Connecticut, have invented an Improvement in Friction-Linings, of which the following is a specification.

This invention has for its object to provide a heat-proof, water-proof and oil-proof friction material of great wear resisting qualities, which shall be adapted for general uses where a high coefficient of friction is required and is especially adapted for use as linings, pads, shoes, bands, etc., in brakes and clutches, also for packings, gaskets and conveying belts where the temperature is high.

In carrying out the invention, asbestos— ordinarily woven—in strips, sheets or pieces of any required thickness and shape, and either with or without wire, is saturated in a mixture comprising the following ingredients: Decoction of ground bone,—one gallon. Alum, preferably ferric alum,—two to ten ounces. Epsom salts (sulfate of magnesia),—fourteen to twenty ounces.

The decoction of ground bone is ordinarily heated and the other ingredients are dissolved therein. The decoction of ground bone should have a specific gravity of 1.01 to 1.02. A suitable decoction may be made by boiling three pounds of ground bone in five gallons of water. The same bone may be subjected to repeated boilings either with or without the addition of fresh bone so long as a decoction having a sufficiently high specific gravity is produced. When the material to be treated is relatively thick and is to be subjected to hard wear, the highest proportions of alum and Epsom salts may be used, viz: ten ounces of alum and twenty ounces of Epsom salts. Should there be a precipitation, the residue may be used again. In making friction rings for use in clutches and for various other uses where the material is relatively thin, less alum and Epsom salts may be used, even as low as two ounces of alum and fourteen ounces of Epsom salts to a gallon of the ground bone decoction, and the decoction need not necessarily be heated. For brake linings and whenever the material is relatively thick or is to be subjected to hard wear, the amount of alum and Epsom salts is increased and as much of each may be used as the decoction of ground bone will take up when heated.

The asbestos, woven or unwoven, is thoroughly saturated in the mixture and is then dried in any suitable manner as in a muffle or by being passed over hot plates. The decoction of ground bone acts as a binder for the Epsom salts, and the latter ingredient serves to render the material less porous and less compressible. In other words, the Epsom salts raises the coefficient of friction.

Having thus described my invention I claim:

1. The herein described material, comprising asbestos impregnated with a mixture of alum and Epsom salts dissolved in a decoction of ground bone.

2. The herein described material, comprising woven asbestos impregnated with a mixture of alum and Epsom salts dissolved in a decoction of ground bone.

3. A material of the character described, consisting of fabricated asbestos having incorporated therewith alum and Epsom salts dissolved in a decoction of ground bone and having a friction producing and wear resisting character.

In testimony whereof I affix my signature in presence of two witnesses.

EDWARD F. KELLEY.

Witnesses:
   WILLIAM R. BEERS,
   ROYAL B. CURTISS.